United States Patent
Kaimal et al.

(10) Patent No.: US 10,353,719 B2
(45) Date of Patent: Jul. 16, 2019

(54) HIGH VOLUME CONFIGURATION OF INFORMATION HANDLING SYSTEMS

(71) Applicant: Dell Products L.P., Round Rock, TX (US)

(72) Inventors: Rajesh B. Kaimal, Round Rock, TX (US); Evan P. Hashemi, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 177 days.

(21) Appl. No.: 15/591,573

(22) Filed: May 10, 2017

(65) Prior Publication Data

US 2018/0329579 A1 Nov. 15, 2018

(51) Int. Cl.
| | |
|---|---|
| G06F 17/22 | (2006.01) |
| G06F 17/30 | (2006.01) |
| G06Q 30/02 | (2012.01) |
| G06N 5/04 | (2006.01) |
| G06F 9/451 | (2018.01) |
| G06F 8/61 | (2018.01) |

(52) U.S. Cl.
CPC .............. *G06F 9/451* (2018.02); *G06F 8/61* (2013.01)

(58) Field of Classification Search
CPC .............. G06F 3/0482; G06F 3/04847; G06F 17/3089; G06F 8/61; G06F 9/451; G06F 16/9535; G06F 17/2247; H04L 67/02; H04L 67/10; H04L 67/42; H04L 67/34; H04W 12/06; G06Q 30/02; G06Q 30/0269; G06Q 30/0641
See application file for complete search history.

(56) References Cited

U.S. PATENT DOCUMENTS

| | | | | |
|---|---|---|---|---|
| 6,167,383 A | * | 12/2000 | Henson ................ | G06Q 10/087 703/13 |
| 7,035,815 B1 | * | 4/2006 | Henson ................ | G06Q 10/087 705/26.5 |
| 8,516,377 B2 | * | 8/2013 | Dixon .................... | G06Q 30/02 715/738 |
| 9,396,295 B2 | * | 7/2016 | Lahav .................... | G06Q 30/02 |

(Continued)

OTHER PUBLICATIONS

Segura et al., High quality parametric visual product configuration systems over the web, 10 pages (Year: 2005).*

(Continued)

*Primary Examiner* — Thuy Dao
(74) *Attorney, Agent, or Firm* — Terrile, Cannatti & Chambers; Stephen A. Terrile (57) ABSTRACT

A system, method, and computer-readable medium are disclosed for performing a validation precomputation operation for use with a configurator, comprising: identifying a plurality of webpages within a configurator, the plurality of webpages allowing a user to configure a system, each webpage of the plurality of webpages enabling the user to select an option from a plurality of options; performing a validation precomputation operation on each of the plurality of webpages, the validation precomputation operation identifying invalid combinations of options from the plurality of options; storing the invalid combinations of options within an array; and, associating the array storing the invalid combinations of options with a respective webpage within the configurator.

15 Claims, 8 Drawing Sheets

(56) References Cited

U.S. PATENT DOCUMENTS

| | | | |
|---|---|---|---|
| 9,742,791 B2* | 8/2017 | Borohovski | H04L 63/1433 |
| 9,747,262 B1* | 8/2017 | Liu | G06F 17/2247 |
| 9,805,006 B1* | 10/2017 | Kuhn | G06F 16/9574 |
| 9,916,285 B2* | 3/2018 | Su | G06F 3/04883 |
| 9,971,740 B2* | 5/2018 | Deguzman | G06F 17/211 |
| 10,262,068 B2* | 4/2019 | Gungor | G06F 16/24556 |
| 2008/0059782 A1* | 3/2008 | Kruse | G06F 8/63 |
| | | | 713/1 |

OTHER PUBLICATIONS

Lamparter et al., Preference-based selection of highly configurable web services, 10 pages (Year: 2007).*

* cited by examiner

{"gog=":["1~0"],"goQ=":["1~0"],"gkg=":["1~0"],"gkQ=":["1~0"],"gig=":["1~0"],"giQ=":["1~0"],"ghg=":["1~0"],"ghQ=":["1~0"],"gYg=":["1~0"],"gYQ=":["1~0"],"gUg=":["1~0"],"gUQ=":["1~0"],"gSg=":["1~0"],"gSQ=":["1~0"],"gRg=":["1~0"],"gRQ=":["1~0"],"Qog=":["1~0"],"QoQ=":["1~0"],"Qkg=":["1~0"],"QkQ=":["1~0"],"Qig=":["1~0"],"QiQ=":["1~0"],"Qhg=":["1~0"],"QhQ=":["1~0"],"QYg=":["1~0"],"QYQ=":["1~0"],"QUg=":["1~0"],"QUQ=":["1~0"],"QSg=":["1~0"],"QSQ=":["1~0"],"QRg=":["1~0"],"QRQ=":["1~0"],"JIg=":["1~0"],"JIQ=":["1~0"],"JEg=":["1~0"],"JEQ=":["1~0"],"JCg=":["1~0"],"JCQ=":["1~0"],"JBg=":["1~0"],"JBQ=":["1~0"],"IYg=":["1~0"],"IYQ=":["1~0"],"IUg=":["1~0"],"IUQ=":["1~0"],"ISg=":["1~0"],"ISQ=":["1~0"],"IRg=":["1~0"],"IRQ=":["1~0"],"FIg=":["1~0"],"FIQ=":["1~0"],"FEg=":["1~0"],"FEQ=":["1~0"],"FCg=":["1~0"],"FCQ=":["1~0"],"FBg=":["1~0"],"FBQ=":["1~0"],"Eog=":["1~0"],"EoQ=":["1~0"],"Ekg=":["1~0"],"EkQ=":["1~0"],"Eig=":["1~0"],"EiQ=":["1~0"],"Ehg=":["1~0"],"EhQ=":["1~0"]};

HIGH VOLUME CONFIGURATION OF INFORMATION HANDLING SYSTEMS

BACKGROUND OF THE INVENTION

Field of the Invention

The present invention relates to information handling systems. More specifically, embodiments of the invention relate to high volume configuration of information handling systems.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

It is known to sell information handling systems online, often via a configuration system that allows for the selection of components. It is known to present information such as error messages if certain selected components do not function together.

SUMMARY OF THE INVENTION

A system, method, and computer-readable medium are disclosed for performing a validation precomputation operation. In certain embodiments, the validation precomputation operation further includes a validation precomputation compression operation. Using the validation precomputation operation within a configurator enables system validation without the need to access back end validation servers in real time. The data for rendering a page (such as a web page) within the configurator is stored in a database which is located locally with respect to the system on which the configurator is executing. Thus, the validation precomputation operation reduces calls to the backend validation servers and increases the response time of the configurator.

Such a validation precomputation operation provides an on-line store with zero real time calls to legacy back end services such as a back end validation server. In certain embodiments, substantially all the data (i.e., more than 90% of data) needed to render a page is stored in a local database (i.e., on the same information handling system on which the webserver is executing). In certain embodiments, the validation precomputation operation includes offline processes that pre-compute substantially all the data (i.e., more than 90% of data) needed to render a page is stored in is stored in a database that is close to the webserver. In certain embodiments, the validation precomputation operation corresponds to a manufacturer specific configurator. In certain embodiments, the manufacturer specific configurators allow users to configure an information handling system with related features and/or components before actually purchasing the configured information handling system. Example features and/or components can include selections relating to support or accidental damage services. With such a validation precomputation operation, rather than having the configurator making real time calls to ensure the choices make by the user are valid, the validation precomputation operation pre-compute all invalid combinations, stores the invalid combinations and compacts the invalid combinations on the page to ensure pages of the configurator are lightweight and perform and scale.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Aspects of the present disclosure include an appreciation that with certain known configurators, when a customer selects certain options within a module, the configurator makes a call to a backend validation service to ensure that the selections are valid. If the user makes an invalid choice, the configuration provides the user with an error message. The process of validating modules and options can require significant compute resources due to the validator needing to check the items selected and ensure that the selections are valid, validate their pricing and also validate that the discounts are applied correctly. Aspects of the present disclosure include an appreciation that certain configuration systems include a dedicated high volume configuration platform. Aspects of the present disclosure include an appreciation that certain configuration systems manage burst traffic by using lightweight pages to ensure site availability.

Aspects of the present disclosure include an appreciation that it would be desirable to reduce or eliminate real time calls to a backend system when performing validation operations. With the present validation precomputation operation the data needed to show which options are invalid are precomputed and locally stored for ready access by the configurator. In certain embodiments, the stored data needed to show which options are invalid are stored with the data for rendering the specific configuration page. This validation precomputation operation results in pages that are very responsive. Such a validation precomputation operation increases the user experience by providing substantially instantaneous feedback to the user about the selections they have made.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
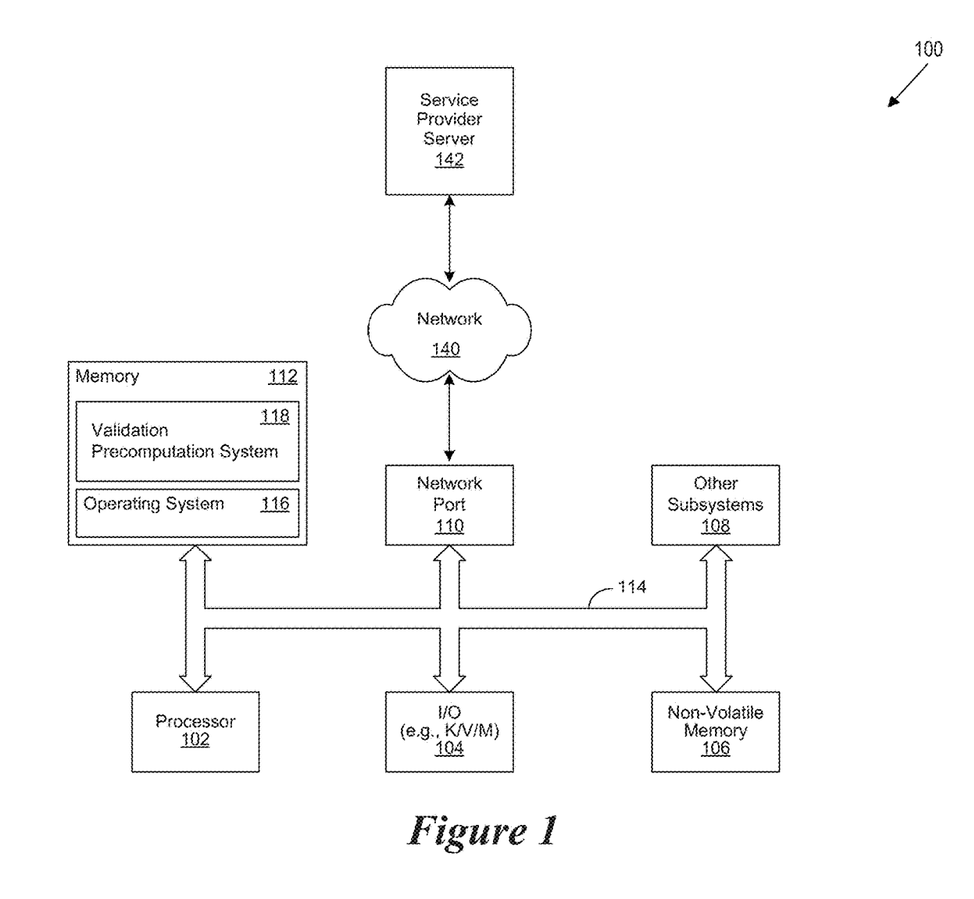
FIG. 1 shows a general illustration of components of an information handling system as implemented in the system and method of the present invention.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise validation precomputation system 118.

The validation precomputation system 118 performs a validation precomputation operation. In certain embodiments, the validation precomputation operation further includes a validation precomputation compression operation. Using the validation precomputation operation within a configurator enables system validation without the need to access back end validation servers in real time. The data for rendering a page (such as Web pages) within the configurator is stored in a database which is located locally with respect to the system on which the configurator is executing. Thus, the validation precomputation operation reduces calls to the backend validation servers and increases the response time of the configurator.

For the purposes of this disclosure a web page (also referred to as webpage or Web page) may be defined as a document that is suitable for access via the Internet via a web browser. The web browser presents the web page on a display device of an information handling system. While the web page is what is presented on the display device, the term is also considered to include a computer file (referred to herein as a web page file) which is often written in a markup language such as hypertext markup language (HTML), which executes to present the web page. The web browser coordinates various web resource elements for the web page file, such as style sheets, scripts, and images, to present the web page represented by the web page file.

Such a validation precomputation operation provides an on-line store with zero real time calls to legacy back end services such as a back end validation server. In certain embodiments, substantially all the data (i.e., more than 90% of data) needed to render a page is stored in a local database (i.e., on the same information handling system on which the webserver is executing). In certain embodiments, the validation precomputation operation includes offline processes that pre-compute substantially all the data (i.e., more than 90% of data) needed to render a page is stored in a database that is close to the webserver. In certain embodiments, a validation data store node is located on each webserver. In certain embodiments, the validation precomputation operation corresponds to a manufacturer specific configurator. In certain embodiments, the manufacturer specific configurators allow users to configure an information handling system with related features and/or components before actually purchasing the configured information handling system. Example features and/or components can include selections relating to support or accidental damage services. With such a validation precomputation operation, rather than having the configurator making real time calls to ensure the choices make by the user are valid, the validation precomputation operation pre-compute all invalid combinations, stores the invalid combinations and compacts the invalid combinations on the page to ensure pages of the configurator are lightweight and perform and scale.

The validation precomputation operation improves processor efficiency (and thus the efficiency of the information handling system 100) by enabling a configurator to quickly validate a configuration without the need to access a remote validation service. As will be appreciated, once the information handling system 100 is configured to perform the validation precomputation operation, the information handling system 100 becomes a specialized computing device specifically configured to perform the validation precomputation operation and is not a general purpose computing device. Moreover, the implementation of the validation precomputation operation on the information handling system 100 improves the functionality of the information handling system and provides a useful and concrete result of more efficient configuration of information handling systems.

An on-line store is one component of an Internet website to which a customer may go to configure a particular information handling system, for example, according to desired options of the customer. The on-line store is typically a subset of a larger Internet website. At the on-line store, a customer can select one or more products in which the customer is interested. Upon selection of a particular product, the on-line store presents the customer with the ability to go to the product information for the particular product, customize the product, price the customized product, purchase the product, and other actions as discussed herein. While shopping happens in the website (i.e., selection of a particular kind of system by a customer), when the customer is ready to purchase a customized system, the customer is then directed to that part of the website which the on-line store application controls.

Figure 2:
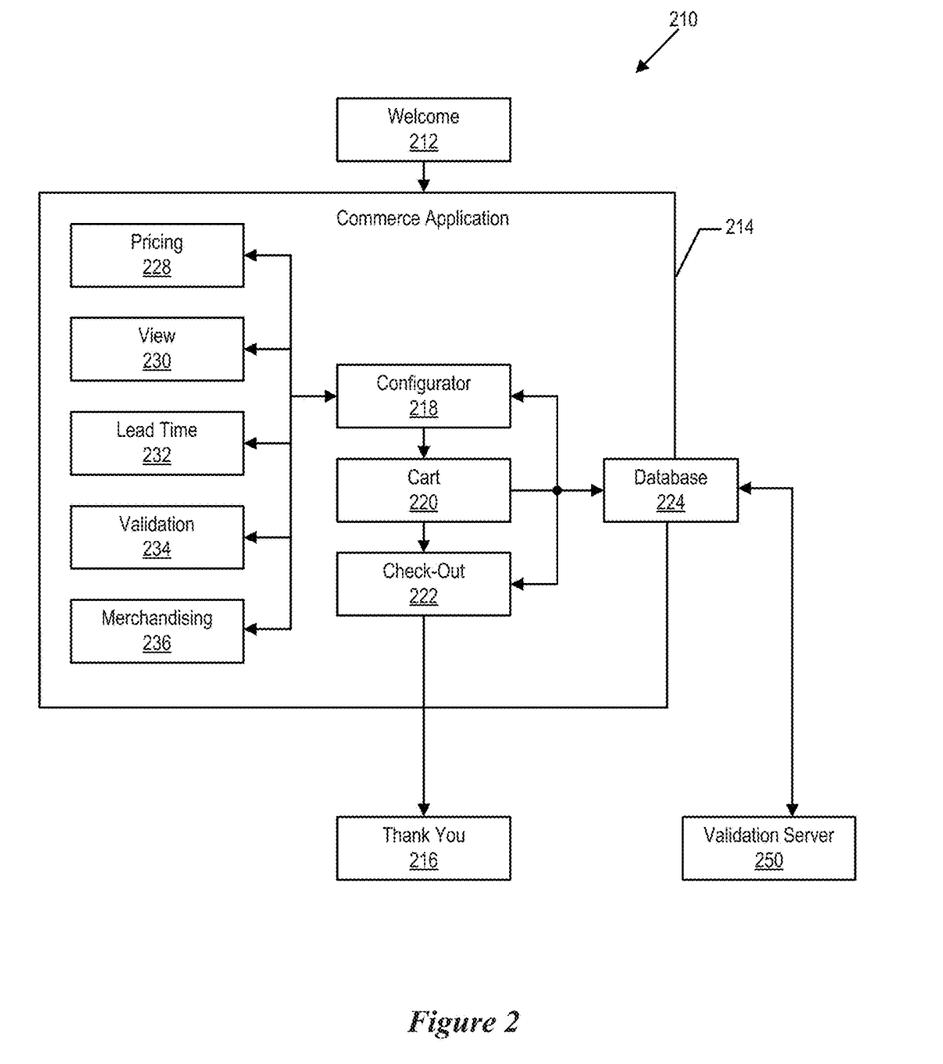
FIG. 2 shows an overview block diagram representation of an on-line store.

Referring now to FIG. 2, an on-line store 210 for use in generating customer configured information handling systems, e.g., customer configured computer systems, is shown. The on-line store 210 includes a welcome or introductory module 212, a commerce application module 214, and a thank you module 216. The on-line store 210 includes an on-line store user interface which enables the system configuration, pricing, and ordering of an information handling system via the Internet. The commerce application 214 includes a configurator 218, shopping cart 220, a checkout module 222, and database 224. The database 224 provides information to the configurator 218, shopping cart 220, and checkout module 222. The configurator 218 includes a pricing module 228, a view module 230, a lead time warning module 232, a validation (or compatibility) warning module 234, and a merchandising module 236. The various modules of the configurator 218 are driven by data from the database 224, and thus the configurator 218, shopping cart 220, and checkout module 222 are all linked to the database 224. In certain embodiments, the database 224 communicates with a validation server 250. In various embodiments, the validation server 250 may be executing a validation service on an information handling system which is separate from the information handling system executing the on-line store 210.

In operation of the on-line store 210, the welcome module 212 presents a welcome page 212, the configurator 218 presents a configurator page, the shopping cart 220 presents a shopping cart page, the checkout module 222 presents a checkout page, and the thank you module 216 presents a thank you page. The welcome page includes a static page and generally resides outside of the commerce application 214. The configurator page, shopping cart page, and checkout page are within the commerce application and use information provided by the database. The checkout includes a payment feature, delivery feature, personal verses business feature, and instructional text features (i.e., how to fill out an on-line form.)

The welcome page is typically an introductory page and includes a link into the on-line store 210. The welcome page is typically a static welcome page. Upon completion of configuration of a system, the customer is transferred to a checkout page. After completion of the checkout, the customer is transferred to a static thank you page 216. The thank you page 216 provides a message of gratitude to the customer for having placed the order or for visiting the on-line store.

Aspects of the configurator 218 which interact with database 224 are shown in FIG. 2. In essence, the entire commerce application 214 interacts with the database. The configurator 218, shopping cart 220, and checkout module 222 are each part of the commerce application 214 and interact with the database 224. For example, with the shopping cart 220, additional merchandising information associated with a particular system which has been configured and placed in the shopping cart by an on-line store customer can be provided.

Figure 3:
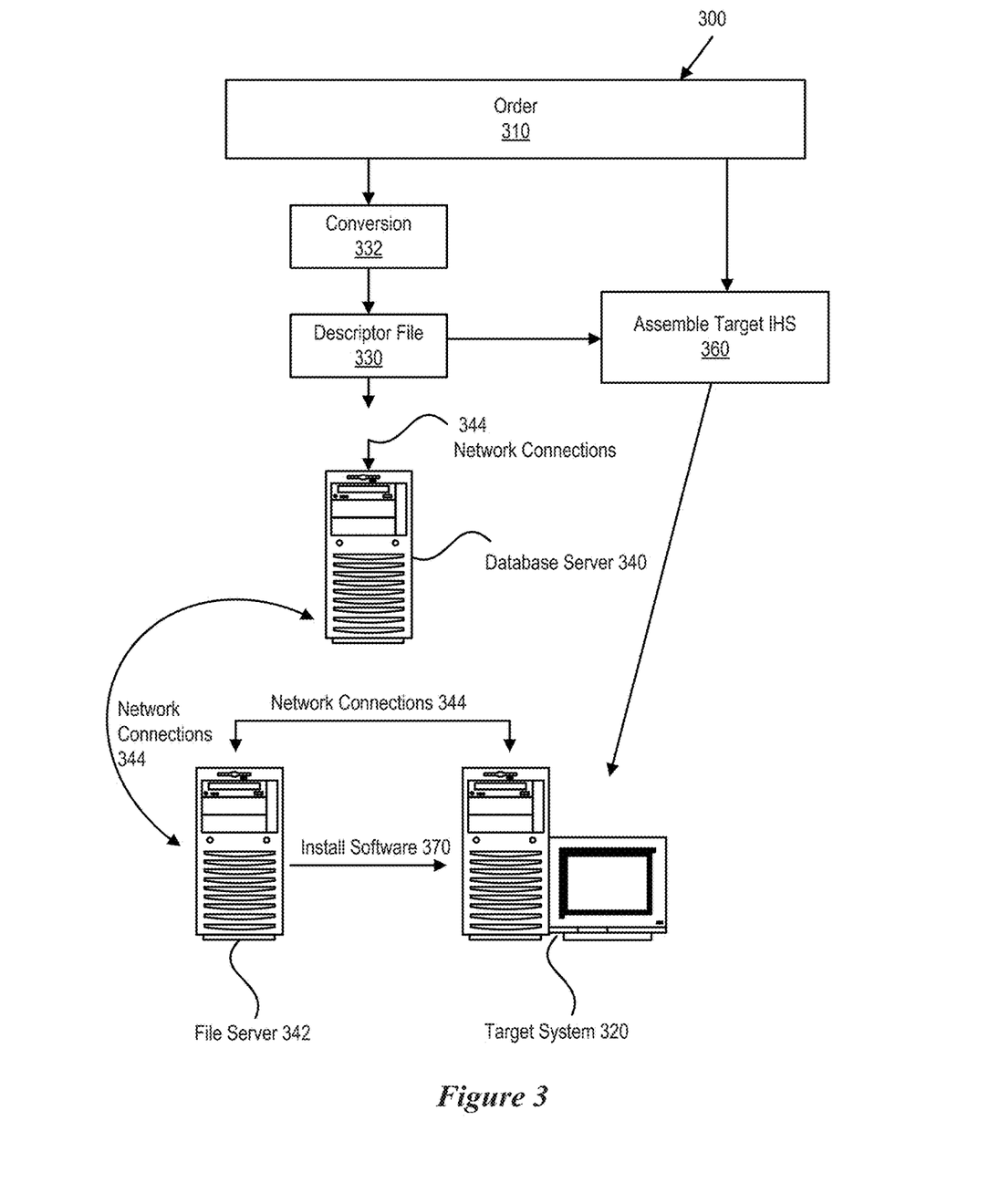
FIG. 3 shows a schematic diagram of a system for installing software on an information handling system configured via an on-line store.

FIG. 3 is a schematic diagram of a software installation system 300 at an information handling system manufacturing site. The software installation operation is one aspect of configuring an information handling system to include the selections provided by a user when interacting with the on-line store.

In operation, an order 310 is placed to purchase a target information handling system 320, via, e.g., the on-line store. The target information handling system 320 to be manufactured contains a plurality of hardware and software components. For instance, target information handling system 320 might include a certain brand of hard drive, a particular type of monitor, a certain brand of processor, as well as particular software products and preordered services. The software may include a particular version of an operating system along with all appropriate driver software and other application software along with appropriate software bug fixes. Before target information handling system 320 is shipped to the customer, the plurality of components are installed and tested. Such software installation and testing advantageously ensures a reliable, working information handling system which is ready to operate when received by a customer.

Because different families of information handling systems and different individual computer components may require different software installations, it is desirable to determine which software to install on a target information handling system 320. A descriptor file 330 is provided by converting an order 310, which corresponds to a desired information handling system having desired components, into a computer readable format via conversion module 332. The descriptor file 330 includes component descriptors corresponding to components determined to be desirable based upon the system validation process. In certain embodiments, the target information handling system 320 is assembled by a manufacturer to include the plurality of hardware components selected by a user when configuring the target information handling system using, for example, the on-line store at step 360. In certain embodiments, the target information handling system is assembled using information derived from the descriptor file 332.

Component descriptors are computer readable descriptions of the components of target information handling system 320 which components are defined by the order 310. In a preferred embodiment, the component descriptors are included in a descriptor file called a system descriptor record (SDR) which is a computer readable file containing a listing of the components, both hardware and software, to be installed onto target information handling system 320. Having read the plurality of component descriptors, database server 340 provides an image having a plurality of software components corresponding to the component descriptors to file server 342 over network connection 344. Network connections 344 may be any network connection well-known in the art, such as a local area network, an intranet, or the internet. The information contained in database server 340 is often updated such that the database contains a new factory build environment. The software is then installed on the target information handling system 320 via file server 342. The software is installed on the target information handling system via the image. The image may include self-configuring code.

The components also include media components. The media components enable the target information handling system 320 to function as a media center edition (MCE) information handling system. The media components include a media configuration file as well as components for interacting with and controlling various media devices.

Figure 4:
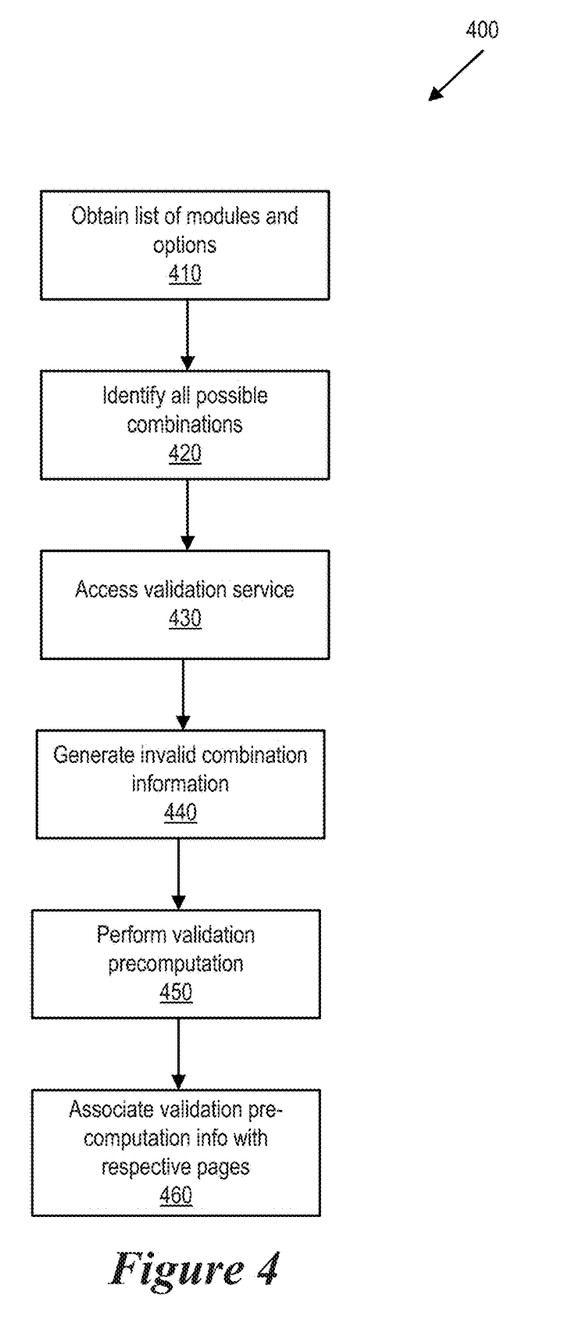
FIG. 4 shows a flow chart of the operation of a validation precomputation operation.

FIG. 4 shows a flow chart of the operation of a validation precomputation operation 400. More specifically, the validation precomputation operation 400 starts at step 410 by obtaining a substantially complete list of modules and options that are applicable to a particular information handling system (i.e., more than 90% of all modules and options applicable to a particular information handling system). Next, at step 420, the validation precomputation operation identifies substantially all possible combinations of models and options for the particular information handling system (i.e., more than 90% of all combinations of modules and options applicable to a particular information handling system). In certain embodiments, the list of all possible combinations is generated by performing a Cartesian product operation.

In certain embodiments, the Cartesian product operation comprises analyzing all possible modules and options for a particular information handling system, applies set theory to the possible modules and options and generates a set of ordered pairs based upon the possible modules and options. a∈A and b∈B. The Cartesian products can be specified using set-builder notation as:

$$A \times B = \{(a,b) | a \in A \text{ and } b \in B\}$$

The Cartesian product operation then generates a table taking the Cartesian product of a set of rows and a set of columns. The Cartesian product of rows×columns is set forth as a table that contain ordered pairs of the form (row value, column value). Next, at step 430, the validation precomputation operation accesses a validation service to validate each combination of modules and options. In certain embodiments, the validation services is executing on a remote validation server.

Next at step 440, the validation precomputation operation generates invalid combination information which includes information regarding all invalid combinations of modules and options. In certain embodiments, the invalid combination information comprises a JavaScript Object Notation (JSON) type object. The JSON type object comprises human-readable text for transmitting data objects comprising attribute-value pairs. In certain embodiments, each attribute-value pair represents a particular invalid combination. In certain embodiments, the JSON type object includes attribute-value pairs for each invalid combination for a particular page of the configurator.

Next at step 450, the precomputation operation performs a validation precomputation compression operation. In certain embodiments, the validation precomputation compression operation comprises a compactor operation. In certain embodiments, the compactor operation comprises a JavaScript Object Notation (JSON) compactor operation. Next, at step 460, the information obtained from performing the validation precomputation compression operation is associated with respective pages of the configurator.

Figure 5:
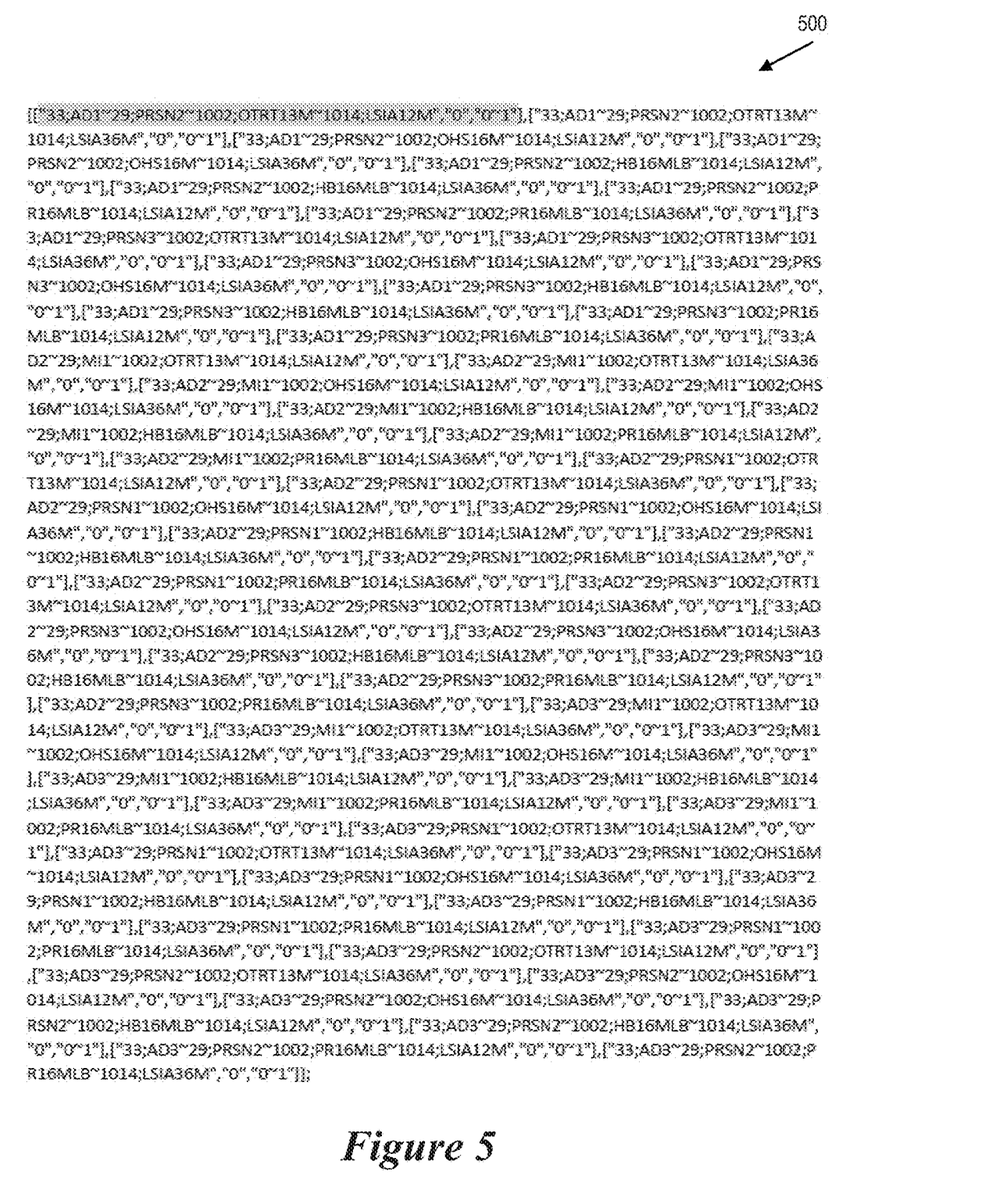
FIG. 5 shows an example of a number of invalid combinations for an actual order code the identified possible invalid module combinations

Referring to FIG. 5, an example of the number of invalid combinations for an actual order code the identified possible invalid module combinations is shown. The invalid combinations are stored in a page as an array so that no service call need be made to the validation service from the client executing the configurator. In certain embodiments, the invalid module combinations are stored in a JavaScript array. The format for storing each combination in the array is:

<id of module 1;id of selected option>~<id of module 2;id of selected option> . . . <id of module n;id of selected option>

For example:
"760;KFHDG60~3;8G2400~8;1801TB~112;4C~29; PRSN1~33;AD2~1002;OTR T13~1014;NOAV"

Such an invalid option combination array addresses the issue of response time; however, it could be necessary to limit the number of module options as number of possible module option combinations grow exponentially and can thus became a problem for including enough options for products having more (e.g., 5 modules with 4 option each) option combinations. The number of combinations grows because the number of combinations is generated as a Cartesian product. For example, with a page that has 5 modules with 4 options each, the number of invalid combinations can be up to 4*4*4*4=1,024 combinations.

Figure 6:
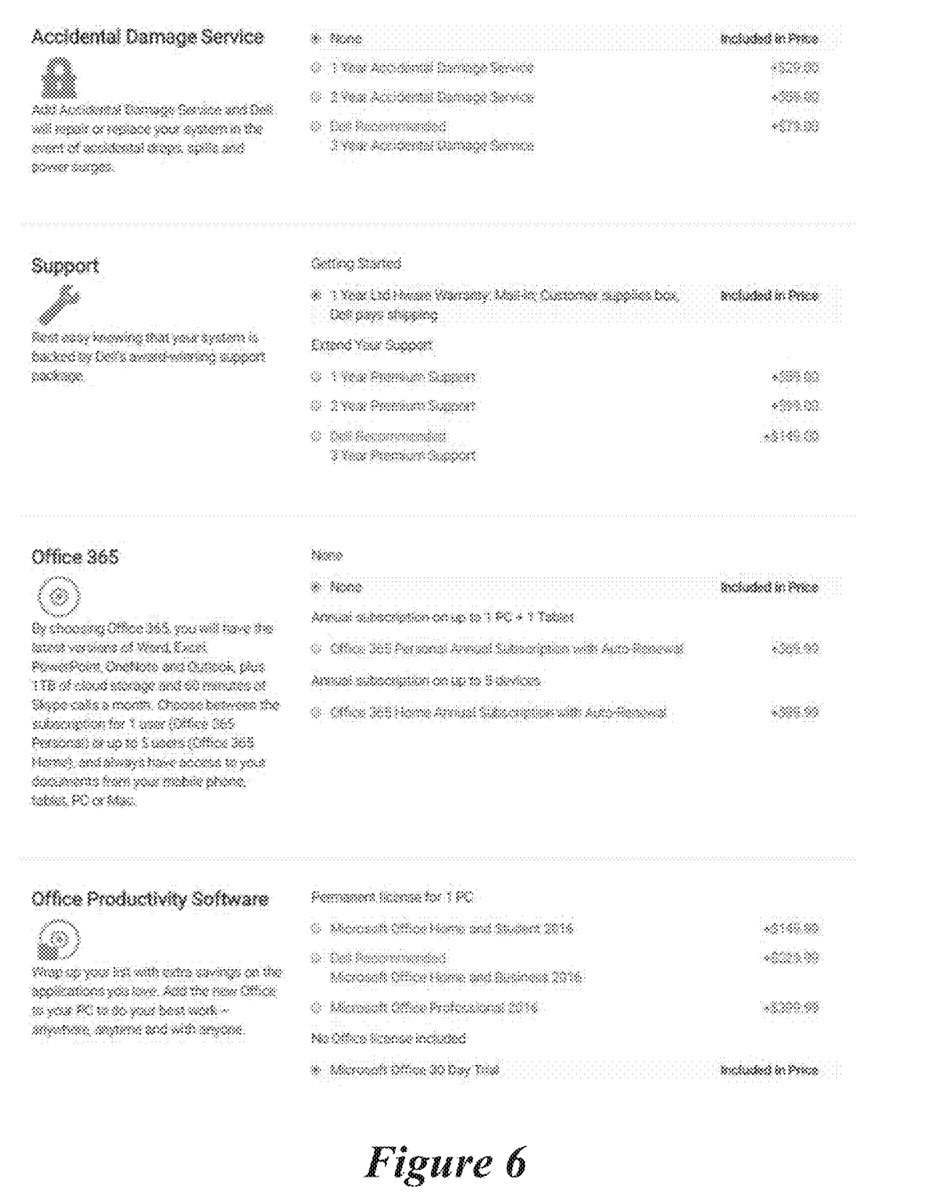
FIG. 6 shows an example screen presentation having a plurality of modules, each having a plurality of options. This order code has 5 modules as shown in the example screen presentation

This order code has four modules with three or four options each as shown in the example screen presentation of FIG. 6. More specifically, FIG. 6 shows an example screen presentation having a plurality of modules, each having a plurality of options.

Figure 7:
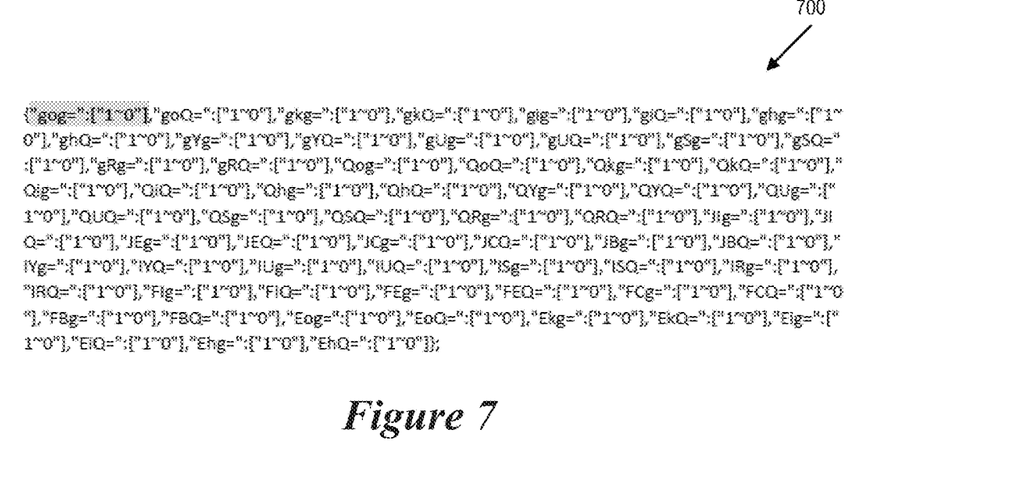
FIG. 7 shows an example of an array representing the invalid combinations where a validation precomputation compaction operation is performed.

Referring to FIG. 7, an example of an array 700 representing the invalid combinations where a validation precomputation compaction operation is performed.

Figure 8:
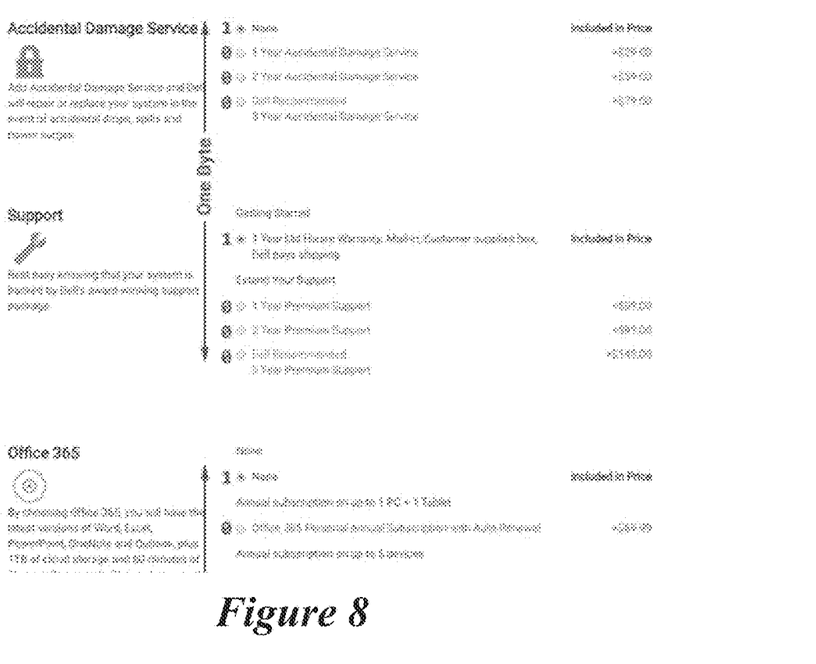
FIG. 8 shows an example screen presentation which is annotated to indicate how options are encoded.

The validation precomputation compression operation uses a binary approach where for each option if the option is selected in the combination the compression operation assigns the option as a 1 to the option otherwise the compression operation assigns the option a 0. In certain embodiments, the options are encoded based upon their respective location within the page with which they are associated. FIG. 8 shows a screen presentation 800 which is annotated to indicate how each option is encoded with a 1 or a 0.

The validation precomputation operation compresses each of eight options into a byte. In certain embodiments, base64 encoding is used to convert the binary byte to text. Base64 encoding encodes arbitrary octet sequences into text that is efficient for non-text 8 bit and binary data. The text generated by the encoding is then stored within the page as an array (e.g., array 700) so that no service call need be made to the validation service from the client executing the configurator.

For example, an example of a JSON object for storing each combination in the array may be set forth as:

"gog=":[1~0"]

This combination would convert to 10000010 10001000 in binary. ("~" represents a binary ones complement operator that is unary and has the effect of 'flipping' bits). This object points to the combination that is invalid while the value part "1~0" points to the index of modules to highlight as invalid. With the example shown, the first module (0) and second module (1) are highlighted as invalid (see e.g., FIG. 9).

The identified possible invalid module combination for a particular page of the configurator is stored in with that page as an array so that no service call need be made to the validation service from the client executing the configurator. In certain embodiments, the invalid module combinations are stored with the page as a JSON object.

Figure 9:
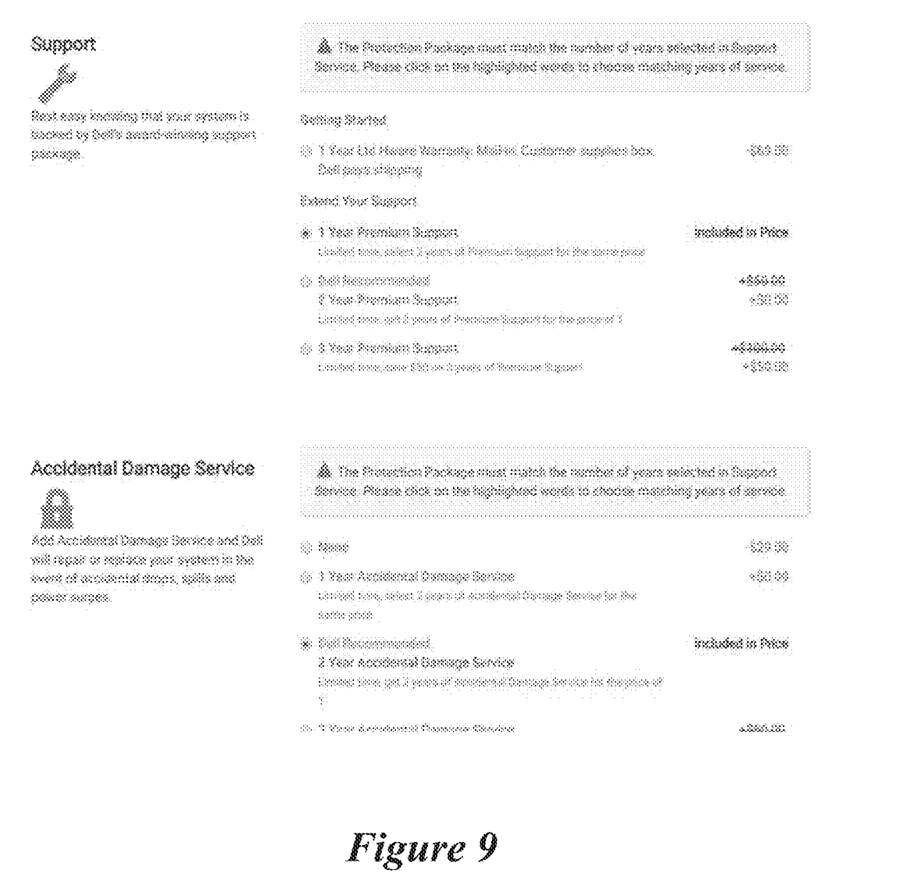
FIG. 9 shows an example of an error message that is generated for an example invalid combination object.

When the customer selects an invalid combination, an error message is presented. FIG. 9 shows an example of the error message that would be generated for the example invalid combination object.

In certain embodiments, the compression operation includes a further enhancement where an error message location indication is only included in the error message array if the error message location indication is not zero and in the case of the absence of the error location, the error message location is defaulted to zero. This further enhancement enables additional compression as most of the time there is only one error message in the error message array.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for performing a validation precomputation operation for use with a configurator, comprising:
   identifying a plurality of webpages within a configurator, the plurality of webpages allowing a user to configure a system, each webpage of the plurality of webpages enabling the user to select an option from a plurality of options;
   performing a validation precomputation operation on each of the plurality of webpages, the validation precomputation operation identifying invalid combinations of options from the plurality of options;
   storing the invalid combinations of options within an array;
   associating the array storing the invalid combinations of options with a respective webpage within the configurator; and,
   performing a validation precomputation compression operation, the validation precomputation compression operation compressing values identifying each of the invalid combinations as an object within the array.

2. The method of claim 1, wherein:
   the object comprises a JavaScript Object Notation (JSON) type object, the JSON type object comprising an attribute-value pair, the attribute-value pair representing a particular invalid combination.

3. The method of claim 2, wherein:
   the array comprises a plurality of the JSON type objects, each of the plurality of JSON type objects comprising an attribute-value pair for a respective invalid combination of options for a particular page of the configurator.

4. The method of claim 1, wherein:
   the validation precomputation compression operation compresses each of eight options into a byte; and,
   base64 encoding is used to convert the byte to text.

5. The method of claim 1, wherein:
   data for rendering a webpage within the configurator and the array representing the plurality of invalid combinations are stored in a database, the database being located locally with respect to an information handling system executing the configurator.

6. A system comprising:
a processor;
a data bus coupled to the processor; and
a non-transitory, computer-readable storage medium embodying computer program code, the non-transitory, computer-readable storage medium being coupled to the data bus, the computer program code interacting with a plurality of computer operations and comprising instructions executable by the processor and configured for:
identifying a plurality of webpages within a configurator, the plurality of webpages allowing a user to configure a system, each webpage of the plurality of webpages enabling the user to select an option from a plurality of options;
performing a validation precomputation operation on each of the plurality of webpages, the validation precomputation operation identifying invalid combinations of options from the plurality of options;
storing the invalid combinations of options within an array;
associating the array storing the invalid combinations of options with a respective webpage within the configurator; and,
performing a validation precomputation compression operation, the validation precomputation compression operation compressing values identifying each of the invalid combinations as an object within the array.

7. The system of claim 6, wherein:
the object comprises a JavaScript Object Notation (JSON) type object, the JSON type object comprising an attribute-value pair, the attribute-value pair representing a particular invalid combination.

8. The system of claim 7, wherein:
the array comprises a plurality of the JSON type objects, each of the plurality of JSON type objects comprising an attribute-value pair for a respective invalid combination of options for a particular page of the configurator.

9. The system of claim 6, wherein:
the validation precomputation compression operation compresses each of eight options into a byte; and,
base64 encoding is used to convert the byte to text.

10. The system of claim 6, wherein:
data for rendering a webpage within the configurator and the array representing the plurality of invalid combinations are stored in a database, the database being located locally with respect to an information handling system executing the configurator.

11. A non-transitory, computer-readable storage medium embodying computer program code, the computer program code comprising computer executable instructions configured for:
identifying a plurality of webpages within a configurator, the plurality of webpages allowing a user to configure a system, each webpage of the plurality of webpages enabling the user to select an option from a plurality of options;
performing a validation precomputation operation on each of the plurality of webpages, the validation precomputation operation identifying invalid combinations of options from the plurality of options;
storing the invalid combinations of options within an array;
associating the array storing the invalid combinations of options with a respective webpage within the configurator; and,
performing a validation precomputation compression operation, the validation precomputation compression operation compressing values identifying each of the invalid combinations as an object within the array.

12. The non-transitory, computer-readable storage medium of claim 11, wherein:
the object comprises a JavaScript Object Notation (JSON) type object, the JSON type object comprising an attribute-value pair, the attribute-value pair representing a particular invalid combination.

13. The non-transitory, computer-readable storage medium of claim 12, wherein:
the array comprises a plurality of the JSON type objects, each of the plurality of JSON type objects comprising an attribute-value pair for a respective invalid combination of options for a particular page of the configurator.

14. The non-transitory, computer-readable storage medium of claim 11, wherein:
the validation precomputation compression operation compresses each of eight options into a byte; and,
base64 encoding is used to convert the byte to text.

15. The non-transitory, computer-readable storage medium of claim 11, wherein:
data for rendering a webpage within the configurator and the array representing the plurality of invalid combinations are stored in a database, the database being located locally with respect to an information handling system executing the configurator.

* * * * *